United States Patent Office 3,479,177
Patented Nov. 18, 1969

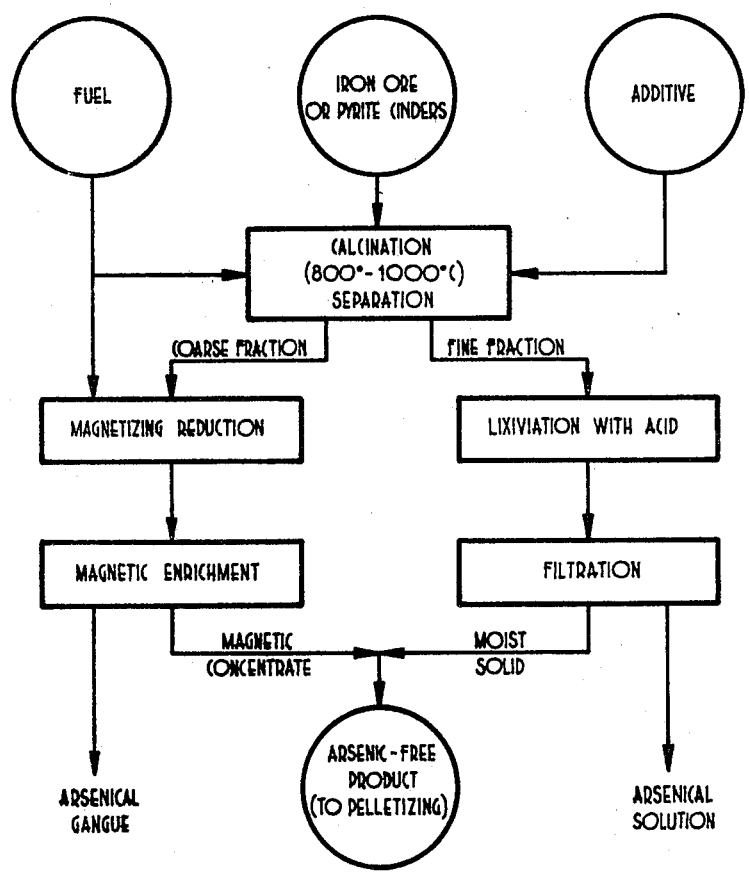

3,479,177
PROCESS FOR REMOVING ARSENIC FROM ARSENIC-CONTAINING IRON MINERALS
Giacinto Veronica, Giuseppe Sironi, and Ariano Colombini, Novara, Italy, assignors to Montecatini Edison S.p.A., Milan, Italy, a corporation of Italy
Filed Oct. 19, 1967, Ser. No. 676,422
Claims priority, application Italy, Oct. 21, 1966, 29,095/66
Int. Cl. C21b *1/02;* C22b *33/00*
U.S. Cl. 75—7    5 Claims

ABSTRACT OF THE DISCLOSURE

Described is a process for removing arsenic from iron minerals or pyrite cinders. Lime or limestone is added to ore which is then subjected to heating in an oxidizing atmosphere. This results in a shift of the granulometric distribution of As in the ore with the finer fraction containing most or the arsenic. The fines are treated with a mineral acid to remove the As leaving Fe. The coarse fraction is subjected to magnetizing reduction and magnetic enrichment.

---

It is known that some iron minerals contain arsenic. This is generally in the form of scorodite ($FeAsO_4 \cdot 2H_2O$), pharmacosiderite ($3Fe_2O_3 \cdot 2As_2O_5 \cdot 13H_2O$), ferrosimplesite ($3Fe_2O_3 \cdot 2As_2O_5 \cdot 16H_2O$) etc. Arsenic is also a rather common component of pyrites, in which it generally appears as arsenopyrite or mispickel ($FeAsS$).

Pyrite is assuming in recent years an increasingly important role as a raw material for the iron and steel industry, besides its traditional role as a raw material for sulphuric acid. For the use in iron and steel metallurgy, pyrite cinders must have a low content of impurities. Arsenic is particularly undesired.

The application of the fluidized bed technique to pyrite roasting has resulted in cinders containing at least 90% of the arsenic originally present in the pyrite. This is caused by the higher working temperatures and the more intense gas-solid contact, than in the conventional multiple-hearth furnaces. The arsenic present in the cinders coming from fluidized bed roasting, is prevailingly in the form of iron arsenate.

Many solutions have been proposed for the removal of arsenic from pyrite, pyrite cinders or, more generally, from any ferrous mineral containing arsenic.

Some proposals concern the methods of roasting arsenical pyrites and are based upon limiting the air/pyrite ratio to a value below that corresponding to complete oxidation of pyrite. Under these conditions, arsenic would be eliminated as $As_2O_3$ or even as $As_2S_3$, both of which are volatile. Since with these processes, the effectiveness of arsenic removal increases with a decrease of oxygen partial pressure in the contacting gases, problems regarding the desulphurization of the mineral occur. Hence, the roasting must be carried out in multiple stages, with the concomitant unavoidable difficulties in regulation and conduction.

Another possibility is to add during pyrite roasting additives (oxides, hydroxides, and various salts of alkali metals and alkaline earth metals) capable of forming the corresponding arsenates, soluble in water or in dilute acid solutions. However, the effectiveness of these additives in the roasting state, is limited by the concomitant formation of the corresponding sulphates. This sulphate formation, besides representing a sulphur loss, is almost completely inactive from the point of view of arsenic fixing.

According to other processes, the same additives are used on pyrite cinders. One such process concerns the addition of the additives to the pyrite cinder in oxidizing medium, at temperatures of 500–900° C., followed by leaching with acid or salt solutions to dissolve the formed arsenate. This type of process, however, can be applied only to cinders having high Fe content, which need no further up-grading of iron. Furthermore, the cinders so purified are very moist and must partially be dried for the pelletizing, which involves consumption of heat.

Still another process, again based on the use of arsenic-removing additives, consists in reducing in a rotary furnace, the iron ores in the presence of calcium oxide or calcium carbonate. The arsenic compound formed, can be separated through dry or wet magnetic separation. An improvement of this process consists in performing the dry magnetic enrichment and then surface-grinding the concentrate obtained, thereafter eliminating by ventilation in an air stream, the finer fractions which are very rich with arsenic. These fractions can be rejected since they contain only a small part of iron. This process, however, can be applied only to coarse-grained minerals.

Since the amount of arsenic which remains in the magnetic concentrate, is a function of the As content of the starting mineral, it is not possible in certain cases, using known methods, to achieve As values which are within the limits allowed in iron and steel metallurgy. This result can be achieved only if as much arsenic as possible is eliminated prior to carrying out the steps of "reduction and up-grading."

We have found that addition of lime or limestone to the arsenical mineral (or cinder) and subjecting said mixture to heating in an oxidizing atmosphere, causes a surprising migration of the arsenic towards the finer granulometric fractions. The arsenic, which has spontaneously concentrated in the finer fractions, can be rapidly and completely solubilized in diluted acid solutions. In other words, we have found that while from a quantitative point of view, the heating in the presence of lime does not produce a variation in the initial over-all arsenic content, it causes a different distribution of the arsenic in the various granulometric classes.

The process of our invention is based upon this realization and consists of the following steps which are diagrammatically represented in the single figure of the drawing:

(1) The ore (this term used hereinafter and in the claims also encompasses pyrite cinders) is subjected to heating in the presence of the additive ($CaO$ or $CaCO_3$). Thus, a considerable portion of the arsenic concentrates in the finer granulometric fractions. The heating is achieved by combustion with air of a fuel (solid, liquid or gaseous). The operation may be performed in a rotary furnace, in a fluidized-bed furnace, etc. The heating is carried out at 800 to 1000° C., preferably at 850–950° C. An additive amount equal to 0.5–5% by weight as Ca with respect to the ore, is employed. A preferred manner of working is to heat the mixture of mineral ore and lime or limestone in a fluidized bed, while adjusting the rate of the gas stream so that it entrains only the fine fractions which therefore will be easily separable by the conventional dry or wet techniques.

(2) Contemporaneously with the first stage (1) or following it, the product is divided into two granulometric fractions defined as the "coarse fraction" and the "fine fraction." If the first stage (1) is performed in a fluidized bed, these fractions correspond, respectively, to the "bed product" and to the "cyclone product."

(3) The "coarse fraction" is subjected to magnetizing reduction and subsequently to magnetic enrichment, carried out completely or partly in the dry state.

(4) The "fine fraction" is leached with an aqueous solution of a strong mineral acid having concentration of from 1 to 5% for a period from 15–30 minutes, at room temperature. At the end, the suspension is filtered and the liquid obtained is rejected.

(5) The magnetic concentrate obtained from the third stage (3) and the moist solid obtained from the fourth stage (4) are mixed together and constitute the product freed from arsenic (As=lower than 0.03%), having high iron content (higher than 60%) and low water content (10–15%). Pellets utilizable in iron and steel metallurgy can be obtained directly from the product.

The separation of the product into two granulometric fractions is carried out at a granulometric value of 0.15 to 0.04 mm., and more commonly from 0.125 to 0.062 mm. The specific granulometric value of separation, should on one hand, contain in the finer fraction most of the original arsenic in a form which is soluble in diluted acids and, on the other hand, yield amounts of iron and moisture such that the mixing of the two products according to the fifth stage (5) yields a global product having an average content of Fe higher than 60% and of $H_2O$ lower than 15%.

Advantages of the present invention are essentially as follows:

A considerable part of the treated mineral is not subjected to the operations of reduction and magnetic enrichment, with corresponding economical advantages.

The magnetic enrichment is carried out on a material already deprived of the finer fractions, with ensuing simplification thereof.

The magnetic enrichment is carried out on a material already considerably impoverished of As, which improves the results obtainable by employing a given technique regarding the residual arsenic amount in the concentrate.

The leaching treatment, while involving the dissolution of 98–100% of the As, does not cause any appreciable solubilization of the iron. Thus the Fe recovery is substantially 100%. This results in total Fe yields higher than those obtained when all of the treated mineral is subjected to magnetic enrichment.

The high solubility of the As contained in the fine fractions coming from the heat treatment with lime permits using a very low liquid/solid leaching ratio with corresponding modest apparatuses requirements for this stage of the process.

The invention as set forth above is illustrated by the following working examples which are intended merely by way of example and are not limitative.

The percentages are by weight.

EXAMPLE 1

1,000 kg. of pyrite cinders containing 54.1% of total Fe and 0.71% of As are used. While the latter is distributed almost uniformly in the various granulometric classes, the Fe content increases with the increase of the fineness and is maximum in the finest fractions, as a consequence of the decripitation which the starting pyrite undergoes during the roasting. Thus,

| Granulometry, mm | +0.21 | +0.125 | +0.088 | +0.062 | −0.062 |
|---|---|---|---|---|---|
| Weight, gercent | 14.3 | 23.1 | 18.2 | 24.4 | 20.0 |
| As, percent | 1.02 | 0.71 | 0.52 | 0.63 | 0.77 |
| Fe, percent | 42.3 | 44.2 | 49.7 | 65.3 | 64.6 |

The distribution of the arsenic above and below 0.088 mm. is, respectively, of 56.7 and of 43.3%, these values being very near to the corresponding granulometric percentages (55.6 and 44.4%, respectively). The cinder is discharged at about 500° C. from a roasting furnace into a fluidized bed furnace, into which calcium oxide is fed in proportion of 3% with respect to the cinder. The thus obtained mixture is fluidized and heated to 900° C., by hot gases obtained by combustion of fuel oil (10 kg.) with air (100 m.³). With this treatment the distribution of As and of Fe in the total product leaving the furnace is:

| Granulometry, mm | +0.21 | +0.125 | +0.088 | +0.062 | −0.062 |
|---|---|---|---|---|---|
| Weight percent | 12.6 | 20.8 | 18.4 | 26.5 | 21.7 |
| As, percent | 0.34 | 0.205 | 0.305 | 0.74 | 1.62 |
| Fe, percent | 43.9 | 44.8 | 45.5 | 61.0 | 60.8 |

The "fine" fractions entrained by the combustion gases at the furnace outlet are collected in a cyclone. The speed of the combustion gases is controlled so as to separate in the cyclone the fine particles which are smaller than 0.088 mm. The coarse fraction, i.e. partices larger than 0.088 mm., is discharged from the bottom of the furnace.

The distribution of the As and of the Fe thus is:
(a) Fraction >0.088 mm. (533 kg.) containing 0.27% of As and 44.95% of Fe
(b) Fraction <0.088 mm. (497 kg.) containing 1.14% of As and 60.6% of Fe It is apparent that the finer fraction now contains 79.4% of the total As, against the initial 43.3%. From the 533 kg. of fraction (a), by reduction and dry magnetic enrichment, 347 kg. of product containing 0.022% of As and 66.05% of Fe are obtained. The fraction (b), subjected to leaching in a 1% sulphuric acid solution, yields a product containing 20% of $H_2O$, equal to 445 kg. of dry product containing 0.025% of As and 66.4% of Fe. This treatment takes place with a substantially quantitative Fe yield, the solubility of the Fe in said solution being negligible. Therefore, a total of 792 kg. of product is obtained having an average Fe content of 66.1% and As content of 0.023%. This corresponds to a total yield of Fe of 98.2% and removal of As of 97.4%. Moreover, the global product contains about 10% of water.

If, on the contrary, according to the known art, both above-mentioned fractions (a) and (b) had been subjected together to reduction and to magnetic enrichment, there would have been obtained 780 kg. of concentrate containing 0.1% of As and 66.6% of Fe, namely removal of 89% As, and recovery of 96% Fe. When operating according to the present invention, with a distinct treatment for each of the two fractions, the operations of reduction and enrichment appear limited to only 533 kg. (instead of 1030 kg.) of cinders which moreover have a remarkably lower As content (0.27% against 0.71%). In the latter case, besides a lower consumption of fuel for the reduction, there is attained a higher arsenic removal by magnetic enrichment carried out according to the same method as used before.

EXAMPLE 2

1,000 kg. of pyrite cinders are used containing 48.9% of total Fe and 0.575% of As. In this case also, while the As content is almost uniform at the different granulometries, the Fe content increases with increasing fineness:

| Granulometry, mm | +0.25 | +0.18 | +0.125 | −0.125 |
|---|---|---|---|---|
| Weight percent | 25.9 | 22.6 | 22.1 | 29.4 |
| As, percent | 0.54 | 0.63 | 0.65 | 0.47 |
| Fe, percent | 40.7 | 42.3 | 47.05 | 63.0 |

24% of total As is present in the fraction <0.125 mm. After mixing with 5% of $CaCO_3$ and heating to 950° C. in a fluidized-bed furnace, 1028 kg. of product are obtained having the following characteristics:

| Granulometry, mm | +0.25 | +0.18 | +0.125 | −0.125 |
|---|---|---|---|---|
| Weight percent | 25.2 | 22.4 | 22.4 | 30.0 |
| As, percent | 0.18 | 0.29 | 0.345 | 1.25 |
| Fe, percent | 41.5 | 41.8 | 45.3 | 58.5 |

The arsenic is now present in the fraction <0.125 mm. in 67.0% of the total content. The separation is carried out at 0.125 mm., obtaining two fractions:
(a) Fraction >0.125 mm., 719 kg. containing 0.26% of As and 42.8% of Fe (b) Fraction <0.125 mm., 309 kg. containing 1.25% of As and 58.5% of Fe The fraction (a) by reduction and enrichment yields 439 kg. of concentrate containing 0.02% of As and 67.1% of Fe. The fraction (b) by leaching in a 3% sulphuric acid solution yields 281 kg. of product containing 0.025% of As and 64.5% of Fe. In total, 720 kg. of product containing 0.022% of As and 66.1% of Fe are obtained with a yield of arsenic removal of 97.3% and Fe recovery of 97.4%. If, on the contrary, according to the known art, the two fractions (a) and (b) are put together and are together subjected to reduction and magnetic enrichment, there are obtained 710 kg. of product containing 0.083% of As and 66.3% of Fe with a yield of arsenic removal equal to 89.8% and yield of Fe recovery corresponding to 96%.

EXAMPLE 3

1,000 kg. of haematitic mineral containing 47.4% of Fe and 0.2% of As are used. Both these elements are reported in almost equal measure in each granulometric class. 10% of $CaCO_3$ are added and the mixture is heated to 870° C. in a rotary furnace, obtaining 1056 kg. of product having the following characteristics:

| Granulometry, mm | +0.5 | +0.25 | +0.125 | +0.06 | −0.06 |
|---|---|---|---|---|---|
| Weight percent | 15.7 | 23.3 | 32.2 | 10.9 | 23.5 |
| As, percent | 0.13 | 0.068 | 0.105 | 0.11 | 0.5 |
| Fe, percent | 42.3 | 48.8 | 44.5 | 48.5 | 47.2 |

Separation is carried out at 0.06 mm., obtaining two fractions:

(a) Fraction >0.06 mm., 821 kg. containing 0.1% of As and 44.3% of Fe
(b) Fraction <0.06 mm., 235 kg. containing 0.5% of As and 47.2% of Fe of which the fraction (a) gives, by reduction and enrichment, 516 kg. of concentrate containing 0.015% of As and 67.5% of Fe, and fraction (b), by leaching in a 2% HCl solution, gives 179 kg. of product containing 0.01% of As and 62.0% of Fe. A total of 695 kg. of product containing 0.014% of As and 66.1% of Fe is obtained with a yield or arsenic removal of 95% and of Fe recovery of 97%. If, on the contrary, according to the known art, all of the product obtained is subjected to reduction and magnetic enrichment, 685 kg. of concentrate containing 0.036% of As and 66.5% of Fe are obtained with a yield of arsenic removal of 87.5% and a yield of Fe recovery of 96%.

While specific sulphuric and hydrochloric acid percentages have been given hereinabove, it is obvious that other mineral acids or other ranges can be used. For example, one can readily use an aqueous solution of sulphuric, hydrochloric, nitric or mixtures thereof in a concentration of from 1 to 5%. The specific acid is dictated by economics.

We claim:

1. A process for removing arsenic from iron ores and pyrite cinders, by treatment with lime or limestone, which comprises:
    (a) mixing arsenic containing iron ore with an additive selected from calcium oxide and calcium carbonate in amount of 0.5–5% as Ca with regard to the weight of the mineral, heating the mixture to 800–1000° C.;
    (b) separating the product into a fine granulometric fraction and a coarse granulometric fraction;
    (c) leaching the fine fraction with a diluted aqueous solution of a strong mineral acid;
    (d) subjecting the coarse fraction to magnetizing reduction and magnetic enrichment; and
    (e) combining the magnetically enriched fraction and the arsenic deprived products as obtained from the two fractions, to give a product with Fe content higher than 60% with As content lower than 0.3% and moisture content of 10–15%, which can be directly pelletized without preliminary drying.

2. The process of claim 1, wherein a mineral acid selected from aqueous solutions of sulphuric, hydrochloric, nitric acid, and mixtures thereof with acid concentrations varying from 1 to 5% for the leaching of the fine fraction, is used.

3. The process of claim 1, wherein in step (a) the temperature is 850–950° C.

4. The process of claim 1, wherein the separation of the fine fraction, on heating with lime, is carried out at a size of 0.15–0.05 mm.

5. The process of claim 4, wherein the fine fraction is 0.12–0.06 mm.

References Cited

UNITED STATES PATENTS

| 879,932 | 2/1908 | Westman | 75—6 |
| 2,132,149 | 10/1938 | Edwin | 75—6 X |
| 2,867,526 | 1/1959 | Heath et al. | 23—200 X |
| 3,185,563 | 5/1965 | Jones et al. | 75—1 |
| 3,330,648 | 7/1967 | Vian-Ortuno et al. | 75—101 |
| 3,361,557 | 1/1968 | Babcock et al. | 75—1 |
| 3,427,149 | 2/1969 | Schwarz | 75—6 |

OSCAR R. VERTIZ, Primary Examiner

G. T. OZAKI, Assistant Examiner

U.S. Cl. X.R.

75—9, 101